UNITED STATES PATENT OFFICE.

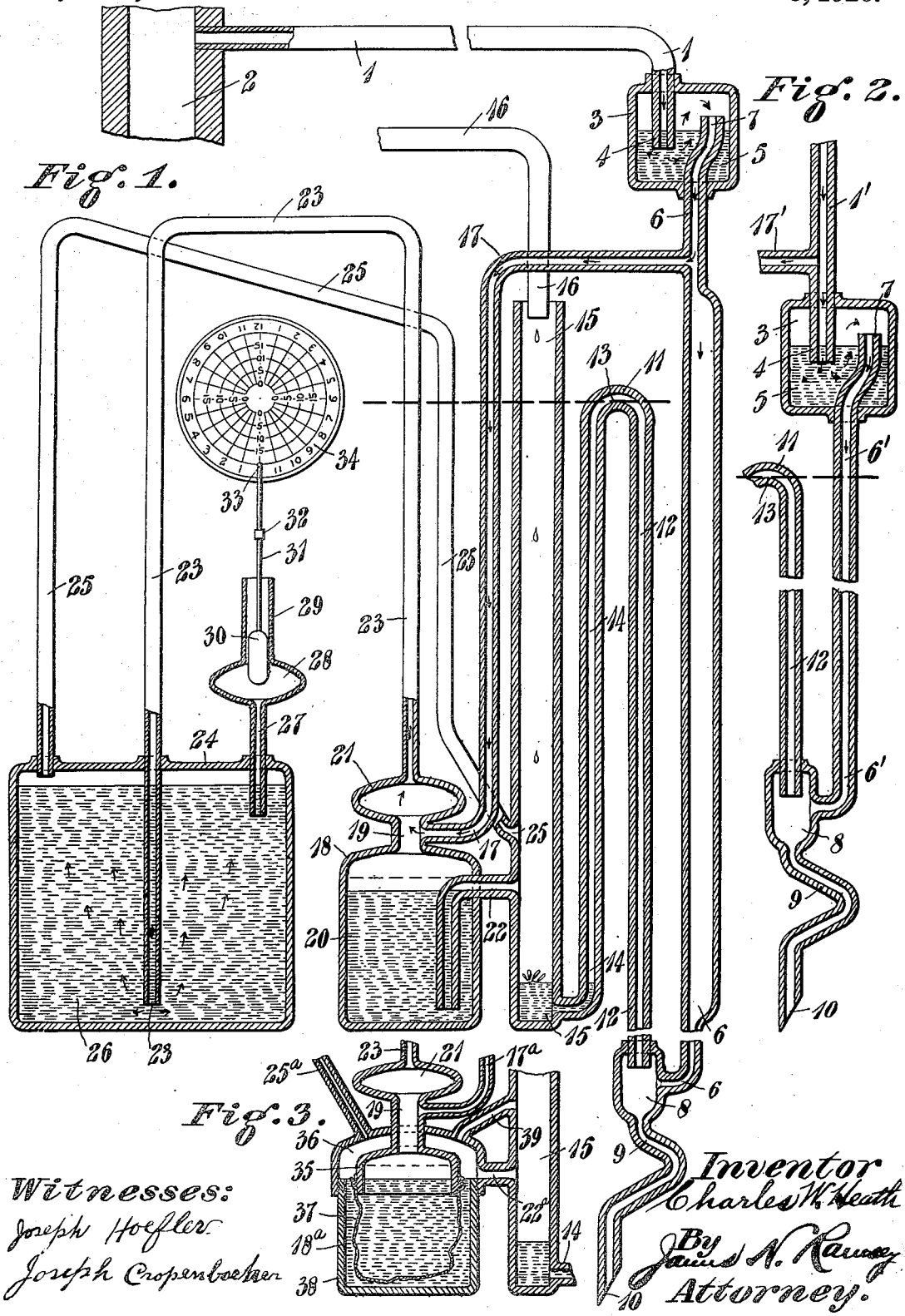

CHARLES W. HEATH, OF CINCINNATI, OHIO.

METHOD OF AND APPARATUS FOR ANALYZING GASES.

1,342,539.  Specification of Letters Patent.  Patented June 8, 1920.

Application filed July 22, 1918. Serial No. 246,259.

*To all whom it may concern:*

Be it known that I, CHARLES W. HEATH, a citizen of the United States, and a resident of Cincinnati, in the county of Hamilton and State of Ohio, have invented certain new and useful Improvements in Methods of and Apparatus for Analyzing Gases, of which the following is a specification.

My invention relates to means for making successive analyses of gases. Its object is to insure greater accuracy and to simplify the construction and operation of the apparatus, as well as to render it more efficient and reliable, less subject to derangement and requiring less labor and expense for construction, installation and maintenance.

In the drawing:

Figure 1 is a vertical sectional diagrammatic view of apparatus embodying my invention;

Fig. 2 is a partial similar view showing a modification; and

Fig. 3 is a partial similar view showing another modification.

As illustrated herein, the device is especially adapted for making frequent records of the percentage of carbon dioxid in the gases leaving a furnace; although it will be understood that the apparatus may be adapted for analyzing gases other than furnace gases.

As shown herein, a supply pipe 1 leads directly from the flue or other inclosure 2, in which are found the gases to be analyzed. This pipe 1 terminates in a trap 3 where it has a downwardly extending end part 4 a suitable distance below the surface of a body of suitable liquid 5. This liquid may be water. The induction pipe 6 has an upper end part 7 within the trap 3, extending above the surface of the liquid 5. As here shown, the part 4 of the supply pipe 1 passes down through the top, and the induction pipe 6 passes out through the bottom of the casing of the trap 3. It will be understood that air-tight connections are made between the respective pipes and the top and bottom where they thus pass through. The trap or seal 3 thus acts as a check valve in the pipe line constituted by the pipes 1 and 6. Any ordinary check valve will serve this purpose. The induction pipe 6 continues downward for a considerable distance, preferably considerably greater than is shown in the drawing, but which is indicated by omitting part of the length of the induction pipe in the lower part of the drawing. At its lower end, this induction pipe 6 leads into the side of an ejector casing 8, which at its top is closed to the atmosphere, and which has leading from its bottom the discharge pipe 9.

This pipe 9 which is relatively narrow and preferably curved, as shown, to insure capillarity therein for proper working of the ejector 8 when required, is, as here shown, beveled at its lower end 10, so that an extended surface is provided adjacent to the outlet orifice, to insure the quick passage of the last drops of the discharge out and away from this orifice, to eliminate the effect of capillarity except when the ejector is required to operate.

A siphon 11 has its longer leg 12 terminating in the upper part of the ejector casing 8; it being understood that this leg of the siphon is in practice somewhat longer than is shown on the drawing, this being indicated by omitting part of the length of this leg 12 as with the showing of the induction pipe 6. The upper bend 13 of the siphon 11 is a considerable distance below the trap 3, and the shorter leg 14 communicates with the interior of a tall, narrow stand-pipe or tank 15 very close to the bottom thereof. A pipe 16 leading from any suitable source of constant supply discharges water into this stand-pipe 15. For clearness, this supply of water is indicated in the drawing as leaving the pipe 16 in the form of distinct drops, although a small continuous stream is generally used.

The apparatus so far described is adapted for drawing, by the intermittent action of the siphon 11, successive charges or blasts of gases from the inclosure 2 through the supply pipe into the induction pipe 6, from which pipe the gases are unable to pass back through the trap or check valve 3. The action will be intermittent, because it is induced by the discharge of the siphon 11 in the ejector casing 8; the passage of the water from the lower end of the long siphon leg 12 past the mouth of the induction pipe 6 in the ejector casing 8 creating the reduced pressure in the induction pipe 6, which results in a flow of the gases from the inclosure 2 to the supply pipe 1 from which they bubble up through the liquid 5 in the trap 3 and enter the induction pipe 6. The action of the siphon 11 is intermittent because there can be no flow of water from the long leg 12 until the water in the stand-pipe 15 has risen to the level of the upper bend 13 of the siphon, as indicated by the heavy broken line in Figs. 1 and 2 of the drawing. When the water does rise this high and become unbalanced, it passes out rapidly through the leg 12, and the supply from the pipe 16 being slower than this outward passage, the stand-pipe 15 is soon emptied down to its outlet into the short leg 14 of the siphon. As soon as this occurs, the siphon will cease to operate and the stand-pipe 15 will be gradually filled again by the uninterrupted and steady supply from the pipe 16. This operation will be periodic with a frequency depending only on the readily regulated supply of water from the pipe 16.

So far as concerns the part of the apparatus so far described, therefore, it is sufficient to note that there will be successive charges or blasts or gases, each one of which will begin to be drawn through the supply pipe 1 into the induction pipe 6 as soon as the siphon begins to discharge, and which will cease to be drawn thereinto as soon as the siphon ceases to discharge. At all other times, there will be no appreciable passage of the gases into the supply pipe 1 from the inclosure 2.

It will thus be seen that means is provided for segregating successive roughly defined quantities of the gases from the inclosure 2 and cutting them off therefrom in the induction pipe 6. Of course, while the ejector thus constituted by the discharging siphon is in operation, there is a current of these gases through the induction pipe and out with the water from the siphon through the discharge pipe 9. But when the siphon ceases to operate, there will, as is readily understood, be a body of the gases left in the induction pipe 6 which will be under atmospheric pressure, because the lower end of the induction pipe is open directly to the atmosphere through the pipe 9 at the bottom of the ejector casing 8.

The purpose of this is to supply, for accurate measurement and chemical treatment by the part of the apparatus hereinafter to be described, a body of the gases which will be under atmospheric pressure at the termination of the accurate measuring operation, so as to insure that every charge of gases, all accurately measured as to volume, will also all have the same pressure. Thus only is it possible to analyze and record the analyses of equal masses of the gases at the successive analyses. Of course, the temperatures of the successive accurately measured charges also influence this result; but it has been found possible to insure practically uniform temperature of the successive accurately measured charges. An example of means for this purpose is disclosed and claimed in my Patent No. 1,124,432, issued January 12, 1915, as are also various other details useful in preventing dilution or adulteration of the gases or of the reagents used in the analyses.

It will be understood that any other details involved in analysis apparatus of this general type may be used in conjunction with my present improvement, which deals peculiarly with the control of the supply and the ultimate pressure of the gases to be analyzed, and by eliminating all ultimate intervention of valves, traps, bags or other means between the preliminary charge and the atmosphere, avoids the disturbing influences unavoidable with such intervening means, because of the change in the operating condition of the intervening elements or their materials, whatever the form of the apparatus may have been. The pressure of the atmosphere in any given locality is sufficiently uniform for the purpose of my invention, so that with the other favorable conditions which it has heretofore been found practicable to provide, I am enabled to measure off and analyze successive charges of the gases which are uniform in mass to a degree that entirely satisfies the most exacting requirements.

It is in the relation to this group of details as a whole to the induction pipe, that the modification of Fig. 2 differs from the example of Fig. 1. Thus, in the example of Fig. 1, the connecting pipe 17 leads from the induction pipe 6; whereas in Fig. 2, the connecting pipe 17′ leads from the supply pipe 1′ corresponding to the supply pipe 1 of Fig. 1, and the induction pipe 6′ has no opening between the trap or check valve 3 and its lower end where it opens into the ejector casing 8. With these explanations, it will be understood that the siphon 11 and its accessories are the same in either example, as may also be the details of the measuring and chemically-treating part of the apparatus which will be supplied through the pipe 17′ of Fig. 2, or through the pipe 17 of Fig. 1.

It will be seen that in this example of Fig. 2, the completion of the measurement of the charge is to be made in connection with a remaining body of gases in the supply pipe 1′; whereas this completion is to be made in the example of Fig. 1 in connection with a remaining body in the induction pipe 6. In the latter case, the pressure will be atmospheric; in the former, it will be whatever is the pressure at that time in the inclosure 2 and communicating spaces, and which pressure in some installations is very variable, as influenced by the wind over the top of the chimney and other variable influences well understood by those familiar with the art of furnace construction and management.

It will be seen, therefore, that the example of Fig. 1 is preferable; although the use of the example of Fig. 2 may afford accurate results where a practically uniform pressure in the inclosure 2 may be expected. In either case there is no intervention of valves, traps, bags or the like at the termination of the accurate measuring operation as in the prior apparatus, as hereinbefore alluded to.

With most analyzing apparatus, and especially with that of the type herein exemplified, the actual period during which the apparatus is taking gas to be analyzed is only about one-fourth of the total cycle of an analysis. Prior devices employ a constant flow or circulation of the gases past the analysis apparatus. Therefore, for about three-fourths of the time, the gases are flowing through the communicating pipe to no practical advantage.

Now these gases being the products of combustion, carry with them large proportions of fine ash, dust and soot which are deposited in the communicating pipe. Where this flow or circulation is constant or continuous, the deposit in any given time will naturally be about four times as much as when the flow of the gases through the pipe is during only about one-fourth of the total time. By providing apparatus which draws these gases through the communicating pipe only for about the time when the supply is needed, the deposit of solid substances is thus reduced to about one-fourth of the usual deposit. The result is that the communicating pipe may be made of about one-fourth of the cross-sectional area. An advantage attends this in the economy of installation, since a pipe of only about half the diameter need be used and the pipe and its fittings are very much less expensive and the labor of installing them very much less.

In addition to this, the minimization of the total amount of gases that must pass through the communicating pipe reduces the frequency with which this pipe must be cleared out, because of the great reduction of opportunity for deposit of the foreign matters in the pipe.

With this understanding of the new conditions created by my improvement for the operation of any suitable volume determining and analyzing apparatus, the example of such apparatus herein given and which is of the type which I prefer, may now be briefly described.

The connecting pipe 17 of Fig. 1, or, as will be understood, the connecting pipe 17' of Fig. 2, if this modification be employed, receives the gases at an upper end communicating with the supply pipe 1' or with the induction pipe 6, as the case may be, which pipe 17 or 17' must at some point be a material distance above the upper bend 13 of the siphon 11 for reasons which will presently be understood. The pipe 17 or 17' leads down from there and communicates with the first measuring vessel 18 preferably in the narrow neck 19 thereof situated between its relatively large lower part 20 and its relatively small upper chamber 21. A water inlet and outlet pipe 22 leads from the side of the stand-pipe 15 into the interior of the lower part 20 of the first measuring vessel 18 and extends down near the bottom of the vessel.

A tube 23 leads from the top of the upper chamber 21 of the first measuring vessel well above the level of the upper bend 13 of the siphon 11, and then over and down close to the bottom of the second measuring vessel 24 which it enters through the top thereof. Also extending in through the top of the vessel 24 is the residue discharge tube 25, which also leads above the level of the bend 13 of the siphon 11 and over and down into the interior of the stand-pipe 15 in the lower part thereof. The vessel 24 is nearly filled with an absorbent liquid 26, which, for analyzing furnace gases, may be a solution of caustic potash. The stem 27 projects down from the float chamber 28 through the top of the vessel 24 with its lower end projecting a suitable distance down into this liquid. The float chamber 28 has the relatively wide and high neck 29 in which a float 30 may move freely up and down, and which float has extending up from it a light rod 31 passing through a guide 32 and carrying suitable record-making means 33 to coact with a chart 34 made to revolve at a constant rate, so that the relative height of the float 30 at different times may be recorded on this chart 34. The details of this recording mechanism, not forming part of the present invention, need not be further described or illustrated herein.

The first measuring vessel 18, with its connections, respectively, to the stand-pipe 15 and the second measuring or absorption vessel 24, as well as to the supply pipe 1' or induction pipe 6, as the case may be, constitutes in fact a pump periodically drawing a quantity of gases through the pipe 17 or 17', accurately measuring part of each quantity and forcing this part over into the absorbent liquid 26 or other absorbent medium in the vessel 24, from which accurately measured part is absorbed the carbon dioxid or other constituent, the proportion of which is to be determined by an elimination and subtraction process, and so controlling the escape of the residual gases that rise above the liquid 26 in the vessel 24, that these gases, by their pressure on the liquid 26; cause it to rise through the stem 27 into the float chamber 28 and push the float 30 and connected recording means up to a height proportional to this pressure of these residual gases. The more of the constituent that was absorbed from the original gas, the less will the recording means be raised, and with the chart properly graduated, the percentage of the arsorbed constituent will be directly indicated on the chart.

This pumping action in the present example is caused by the periodic rising and falling of the body of water in the stand-pipe 15.

Supposing that the water in the stand-pipe 15 has reached the level of the upper bend 13 in the siphon 11 and the discharge of the siphon and the ejector action begins, inducing a flow of gases into the vicinity of the inlet of the pipe 17 or 17', as the case may be, the water in the stand-pipe now balls rapidly. In filling the stand-pipe to that height, it has, of course, by its communication through the pipe 22 and vessel 18, risen in the pipe 17 or 17' and also in the adjacent parts of the tubes 23 and 25. As the water falls in the stand-pipe 15, it will fall in the connecting pipe 17 or 17' and the gases will rush in through this pipe, under the pressure in the pipe 6 or 1', and follow the water down in the pipe 17 or 17'. When the water has fallen below the level of the entrance of the pipe 17 or 17' to the neck 19, these gases enter the first measuring vessel 18 and this intake of the gases will continue until the water has fallen to a level where it will no longer flow out through the pipe 22. Also during this operation, the water will have been falling in the discharge tube 25 and the residual gases from the previous analysis in the vessel 24 above the liquid 26 will follow this falling water, and when the water in the stand-pipe 15 falls below the entrance of the tube 25 therein, these residual gases will be partly discharged to the atmosphere through the open top of the stand-pipe 15; this discharge being facilitated by the pressure due to the liquid 26 regaining its lower level from where it has been held up in the float chamber 28 by these residual gases as long as they were confined by the water risen in the tube 25.

Another action takes place during this period which is especially important as making clear the principle of the present improvement.

The liquid 26 in the vessel 24, of course, acts as a seal or check-valve, so that no gases can flow back into the tube 23 from the vessel 24. As the final amount of gas is discharged from the measuring chamber 31, the water 20 from the stand-pipe 15 enters a short distance up into this tube 23. As the water falls therein, there is no supply of gaseous substance to maintain the pressure above the water, the only pressure being that of the negligible quantity of gases that remained in this tube 23 at the last analysis. There will, therefore, be a partial vacuum in the tube 23 during the falling of the water in the stand-pipe 15 until the water falls below the entrance of the connecting pipe 17 or 17', which vacuum will then, of course, be reduced by the inrush of the new charge of gases from the supply that is then passing through either the pipe 1' of Fig. 2 or the pipe 6 of Fig. 1 under the ejector action set up by the still discharging siphon 11. But owing to this ejector action, the tendency of the gases to pass into the pipe 17 or 17', even with the partial vacuum prevailing in the first measuring vessel 18, is not as great as it will be when the ejector action ceases and there again prevails either the atmospheric pressure in the induction pipe 6 or the normal pressure in the supply pipe 1' where the apparatus is connected directly to the flue or other space 2.

The consequence of this is that the level at which the water stops overflowing from the first measuring vessel 18 through the pipe 22 as the water in the stand-pipe passes below this pipe 22, is, in the example of Fig. 1, considerably higher than it will ultimately be when the ejector action ceases and the atmospheric pressure is free to act on the surface of the liquid remaining in the vessel 18 and press the liquid down therein and up inside the tube 22 for the surplus to flow over into the now practically empty stand-pipe 15. The pressure in the stand-pipe 15 is, of course, atmospheric, and the action will be simply a balancing one during which the level of the water in the vessel 18 falls sufficiently to cause, in the example of Fig. 1, a material intake of gases after the ejector action has ceased. It is thus insured that the final intake will be under the influence of the pressure of the source from which it was desired to take the gases, undisturbed by any impelling action, whether this pressure be atmospheric as it will be with the inlet from the induction pipe 6, or the pressure of the space 2 if directly from the supply pipe 1'.

Thus, whatever may have been the pressure prevailing while the first measuring vessel 18 was receiving gases from a body of gases under the action of the ejector, the ultimate pressure will be this pressure of the gases in a quiescent state.

Therefore, with the stand-pipe now gradually filling again and overflowing through the pipe 22 into the vessel 18, and the water therein rising, and, for the time being, forcing contained gases back through the conducting pipe 17 or 17', the communication of the upper chamber 21 of the vessel 18 with the source of supply will be cut off when the water passes the lower end of the pipe 17 or 17' in the neck 19 of the vessel 18. It will be seen that the roughly defined volume of gaseous mixture has become substantially quiescent and the atmospheric or other dependable pressure set up in this volume of gas after the ejector action had ceased, will now long since have been well established, and it will be this pressure at which the definitely and accurately measured volume will be cut off in the upper chamber 21.

It is, therefore, not essential that there should be any material intake of gases to the measuring chamber 21 after the ejector stops, although this always occurs in some degree.

The water continuing to rise, will push substantially all of this accurately measured volume of gases over into the absorbent liquid 26 in the vessel 24 for the absorption, and the subsequent measurement of the residue, as hereinbefore described.

These operations, of course, will recur repeatedly with the rising and falling of the water in the stand-pipe under the action of the siphon. And every time that the siphon creates a condition in the accurately measuring apparatus for receiving gases, it also, by its ejector action, creates a condition in the pipe 6 or the pipe 1', as the case may be, for segregating a roughly defined quantity of the gases from which the accurate charge is to be taken and determined at the next rising of the water, which quantity has become substantially quiescent under conditions created between the ceasing of the ejector action and this accurate determination.

Where these gases are taken from the induction pipe 6 after having passed through the trap 3, so that the atmospheric pressure is controlling, the cross-section of the induction pipe may be increased, as shown in Fig. 1, because it increases the relative volume of gases in the induction pipe below the entrance to the conducting pipe 17 to such an extent that should there be a considerable volume of back-flow through the induction pipe, due to atmospheric pressure through the ejector-casing 8, as during the change of liquid level in the vessel 18 after the ejector action has stopped, the entrance of air to the measuring chamber 18 will be prevented. It may be said, however, that ordinarily the induction pipe 6 will have sufficient volume to insure this, since it should be carried down for a considerable distance along with the long leg 12 of the siphon, because the force of discharge of the siphon depends largely on the length of this leg 12.

As hereinbefore alluded to, considerable modification in the details of the measuring and absorption and recording parts of the apparatus may be made in accordance with requirements peculiar to these; but it will be understood that any apparatus of this type and operating periodically according to the broad principle of this type of apparatus, may have its operation greatly improved and its construction and maintenance greatly simplified by the embodiment therein of my present invention. The advantages are especially realized in the example of Fig. 1 where atmospheric pressure at the ultimate volume-determining instant in the operation of the measuring device is insured at every analysis.

In the modification of Fig. 3, the first measuring vessel 18$^a$ has its upper part connected directly with the interior of the stand-pipe 15 by a short pipe 22$^a$, and a bell 35 depends from the neck 19 with its lower rim well below the pipe 22$^a$. The water in the vessel 18$^a$, never falling below where it will run out through the pipe 22$^a$, will thus always submerge the lower rim of the bell 35 and at all times form a liquid seal between the space inside the bell 35, which communicates through the neck 19 with the upper part 21 of the vessel 18$^a$, and the space 36 outside the bell 35 within the vessel 18$^a$, which communicates with the stand-pipe 15 through the pipe 22$^a$.

As here shown, a flexible bag 37 is fastened around the lower part of the bell 35 so that two liquid spaces are defined, the one inside the bag 37 containing water which will not materially affect the gases, and the space outside receiving the water which flows in and out from the stand-pipe 15 in the manner hereinbefore described. This inflow and outflow of this water will cause the water in the flexible bag 37 to rise and fall past the mouth of the connecting pipe 17$^a$ for forcing the gases into the second measuring chamber and through the tube 23.

The bag 37 need not be used except in localities where the water is strongly alkaline or otherwise active upon the gases that are to be analyzed. But when the bag 37 is not used, the bell 35 may simply take the place of the tube 22 extending close to the bottom of the vessel 18 in Fig. 1. This allows the pipe 22$^a$ to be short and straight; and the lower part 38 of the vessel 18$^a$ may be detachable from the upper part, as by being threaded therein, as shown. This makes it convenient to equip the device with the bag 37 whenever this is found necessary, without disturbing any of the numerous connections to the upper part of the vessel 18$^a$.

Where the bell 35 is used, it is preferable to have the discharge tube 25$^a$ enter the space 36, and to lead another discharge tube 39 from this space into the stand-pipe 15 at the proper height, in place of the tube 25 leading directly into the stand-pipe 15, as in Fig. 1. This avoids the trapping of air or gases in the space 36 at each rise of the water.

Otherwise it will be understood that the device, with these modifications of Fig. 3, may be constructed as fully shown in Fig. 1, and the connecting pipe 17$^a$ may be connected either as the pipe 17 in Fig. 1, or as the pipe 17' in Fig. 2, and thus used in conjunction with the ejector and siphon, as hereinbefore fully described in connection with either example. The principle of operation of the bag 37, when used, is similar to that of the device disclosed and claimed in my Patent No. 1,121,244, dated December 15, 1914, and it will be understood that other details of that patent may be found useful in connection with the present invention. Also, my Patent No. 1,119,956, dated December 8, 1914, disclosing and claiming analysis apparatus with more especial relation to the recording means, includes details in conjunction with which the present invention may be readily used. In fact, any analysis apparatus of the general type therein exemplified may be improved by the incorporation therein of the present invention. Many modifications are therefore possible, and while certain constructional details are deemed preferable in connection with my invention, and I have shown and described these rather specifically in elucidating the construction and use of my invention, as is required, I do not wish to be understood as being limited to such precise showing and description, but having thus fully described my invention, what I claim as new and desire to secure by Letters Patent is:

1. The method of analyzing a gaseous mixture, which comprises drawing a roughly defined quantity of said mixture and withdrawing from this quantity, while it is being thus drawn, a volume of said mixture but leaving said volume connected with said quantity, then leaving said roughly defined quantity substantially quiescent, then cutting off some of the volume withdrawn, whereby the pressure of the volume, thus cut off, is substantially that of this quiescent quantity of mixture, and then analyzing said cut off volume of mixture.

2. The method of analyzing a gaseous mixture, which comprises drawing a roughly defined quantity of said mixture in an inclosure open to the atmosphere, and withdrawing from this quantity, while it is being thus drawn, a volume of said mixture but leaving said volume connected with said quantity, then leaving said quantity of the mixture substantially quiescent and at substantially atmospheric pressure, then cutting off some of the volume withdrawn, whereby the pressure of the volume, thus cut off, is substantially atmospheric, and then analyzing said cut off volume of mixture.

3. The method of analyzing a gaseous mixture, which comprises exposing said mixture to the influence of both the inlet and discharge ends of an operating siphon, in a suitable inclosure, whereby a roughly defined quantity of said mixture is segregated under the influence of said discharge end of said siphon and a volume of said mixture is withdrawn under the influence of said inlet end of said siphon, then stopping said siphon and thereby leaving said quantity of the mixture substantially quiescent, then cutting off some of said volume, whereby the pressure of the volume, thus cut off, is substantially that of this quiescent quantity of mixture, and then analyzing said volume of mixture thus cut off.

4. The method of analyzing a gaseous mixture which comprises exposing said mixture to the influence of both the inlet and discharge ends of an operating siphon, in a suitable inclosure open to the atmosphere, whereby a roughly defined quantity of said mixture is segregated under the influence of said discharge end of said siphon and a volume of said mixture is withdrawn under the influence of said inlet end of said siphon, then stopping said siphon and thereby leaving said quantity of the mixture substantially quiescent and at substantially atmospheric pressure, then cutting off some of said volume, whereby the pressure of the volume, thus cut off, is substantially atmospheric, and then analyzing said volume of mixture thus cut off.

5. In gas-analysis apparatus, determining means for determining and delivering to analyzing means a volume of gaseous mixture to be analyzed, means for drawing a roughly defined quantity of gaseous mixture, means for admitting a volume of said quantity to said determining means while said quantity is being drawn but leaving said volume connected with said quantity, means for cutting off the admitted volume of mixture in said determining means and thereby determining the volume of said mixture to be analyzed, and means for terminating the drawing operation on said mixture before said volume is cut off, whereby said drawn quantity is substantially quiescent when said volume is determined, and whereby the pressure of the determined volume is substantially that of this quiescent quantity of mixture.

6. In gas-analysis apparatus, determining means for determining and delivering to analyzing means a volume of gaseous mixture to be analyzed, means for drawing a roughly defined quantity of gaseous mixture and retaining some of said quantity of mixture in communication with the atmosphere, means for admitting a volume of said retained quantity of mixture to said determining means while the mixture is being thus drawn and exposed to the atmosphere, but leaving said volume connected with said quantity, means for cutting off the admitted volume of mixture in said determining means, whereby a volume of said mixture is determined in said determining means, and means for terminating the drawing operation on said quantity of mixture before said volume is cut off, and thereby leaving said drawn quantity of mixture substantially quiescent at the determination of said volume, whereby the pressure of the determined volume is substantially the atmospheric pressure of this substantially quiescent quantity of mixture.

7. In gas-analysis apparatus, the combination of a main gas pipe-line, means for causing an intermittent flow of a gaseous mixture through said main pipe-line, a gas-measuring vessel, a branch of said main pipe-line communicating with said vessel, and means for transferring from said main pipe-line through said branch into said vessel, and measuring in said vessel, successive charges of said gaseous mixture to be delivered from said vessel for analysis.

8. In gas-analysis apparatus, the combination of a main gas pipe-line, an intermittently operating gas ejector, means whereby said ejector causes an intermittent flow of a gaseous mixture through said main pipe-line, a gas-measuring vessel, and means for transferring, during the time of gas flow in said main pipe-line, successive charges of said gaseous mixture from said pipe-line to said vessel and measuring said charges to be delivered from said vessel for analysis.

9. In gas-analysis apparatus, the combination of a main gas pipe-line, means for causing an intermittent flow of a gaseous mixture through said main pipe-line, means in said main pipe-line for permitting said intermittent flow but for preventing flow in the opposite direction, a gas-measuring vessel communicating with said main pipe-line, and means for transferring from said main pipe-line to said vessel, and measuring in said vessel, successive charges of said gaseous mixture to be delivered from said vessel for analysis.

10. In gas-analysis apparatus, the combination of a main gas pipe-line, means for causing an intermittent flow of a gaseous mixture through said main pipe-line, means in said main pipe-line for permitting said intermittent flow but for preventing flow in the opposite direction, a gas-measuring vessel, and means for transferring, during the time of gas flow in said main pipe line, successive charges of said gaseous mixture from said pipe line to said vessel and measuring said charges to be delivered from said vessel for analysis.

11. In gas-analysis apparatus, the combination of a main gas pipe-line, an ejector, means for intermittently operating said ejector to intermittently draw a gaseous mixture through said main pipe-line, means in said main pipe-line to permit said gaseous mixture to be drawn through said main pipe-line but to prevent flow in the opposite direction, a gas-measuring vessel in communication with said main pipe-line between said means for preventing back-flow and said ejector, means for transferring successive charges of gas from said main pipe-line to said measuring vessel while said gaseous mixture is being drawn through said main pipe-line, means whereby said successive charges are accurately measured as to volume, and means whereby said ejector is inoperative at the time of accurate measurement and affords free communication through said main pipe-line between the interior of said vessel and the atmosphere.

12. In gas-analysis apparatus, the combination of a main gas pipe-line, an ejector, means for intermittently operating said ejector to intermittently draw a gaseous mixture through said main pipe-line, means in said main pipe-line to permit said gaseous mixture to be drawn through said main pipe-line but to prevent flow in the opposite direction, a gas-measuring vessel in communication with said main pipe-line between said means for preventing back-flow and said ejector, means for transferring successive charges of gas from said main pipe-line to said measuring vessel while said gaseous mixture is being drawn through said main pipe-line, means whereby said successive charges are accurately measured as to volume, and means whereby said ejector is inoperative at the time of accurate measurement and affords free communication through said main pipe-line between the interior of said vessel and the atmosphere.

13. In gas-analysis apparatus, the combination of a main gas pipe-line, an intermittently operating siphon, a liquid supply for said siphon, an ejector intermittently operated by the discharge from said siphon to intermittently draw a gaseous mixture through said main pipe-line, means in said main pipe-line to permit said gaseous mixture to be drawn therethrough but to prevent flow of said mixture in the opposite direction, a gas-measuring vessel communicating with said main pipe-line between said means for preventing back-flow and said ejector, means for transferring from said main pipe-line to said measuring vessel successive charges of gas while said gaseous mixture is being drawn through said main pipe-line, means whereby successive charges of said mixture are accurately measured as to volume, and means whereby said siphon and ejector are inoperative at the time of measurement whereby the pressure of said charges is equalized with the pressure of the atmosphere in communication with the interior of said measuring vessel through said ejector and said main pipe line.

14. In gas-analysis apparatus, the combination of a main gas pipe-line, an intermittently operating siphon, a liquid supply for said siphon, an ejector intermittently operated by the discharge from said siphon to intermittently draw a gaseous mixture through said main pipe-line, means in said main pipe-line to permit said gaseous mixture to be drawn therethrough but to prevent flow of said mixture in the opposite direction, a gas-measuring vessel communicating with said main pipe-line between said means for preventing back-flow and said ejector, means for transferring from said main pipe lien to said measuring vessel successive charges of gas while said gaseous mixture is being drawn through said main pipe-line, means whereby successive charges of said mixture are accurately measured as to volume, and means whereby said siphon and eejctor are inoperative at the time of measurement whereby the pressure of said charges is equalized with the pressure of the atmosphere in communication with the interior of said measuring vessel through said ejector and said main pipe line.

15. In gas-analysis apparatus, a gas pump comprising a siphon whereby said pump is intermittently operated, an ejector receiving the discharge of and thereby intermittently operated by said siphon, a supply pipe leading from the ultimate source of supply of the mixture that is to be analyzed, an induction pipe communicating with said ejector, means permitting flow of said mixture from said supply pipe into said induction pipe under the action of said ejector, but preventing back-flow of said mixture from said induction pipe into said supply pipe, one of the aforesaid pipes being connected with said gas pump, said siphon operating said pump to take in mixture from said one of said aforesaid pipes while the siphon is discharging and operating said ejector and said ejector is causing flow of said mixture into said one of the aforesaid pipes, and said pump comprising means for maintaining communication between said one of the aforesaid pipes and said pump until said siphon ceases to discharge, and thereafter cutting off said communication, whereby a definite volume of said mixture is delivered by said pump to analyzing means at the pressure of the mixture in said one of the aforesaid pipes after said mixture has become substantially quiescent therein.

16. In gas-analysis apparatus, a gas pump comprising a siphon whereby said pump is intermittently operated, an ejector receiving the discharge of and thereby intermittently operated by said siphon, a supply pipe leading from the ultimate source of supply of the mixture that is to be analyzed, an induction pipe communicating with said ejector and open to the atmosphere therethrough, means permitting flow of said mixture from said supply pipe into said induction pipe under the action of said ejector, but preventing back-flow of said mixture from said induction pipe into said supply pipe, said induction pipe being connected with said gas pump, said siphon operating said pump to take in mixture from said induction pipe while the siphon is discharging and operating said ejector and thereby causing flow of said mixture into said induction pipe, and said pump comprising means for maintaining communication between said induction pipe and said pump until said siphon ceases to discharge, and thereafter cutting off said communication, whereby a definite volume of said mixture is delivered by said pump to analyzing means at the substantially atmospheric pressure of the mixture in said induction pipe after said mixture has become substantially quiescent therein.

17. In gas-analysis apparatus, a supply pipe leading from the ultimate source of supply of mixture, an induction pipe, means permitting flow of mixture from said supply pipe into said induction pipe but preventing back-flow of mixture from said induction pipe to said supply pipe, a gas pump comprising a measuring vessel, one of the aforesaid pipes being in communication with said measuring vessel, a stand-pipe, means to supply liquid to said stand-pipe, means for conducting liquid between said stand-pipe and said measuring vessel, a siphon periodically discharging liquid from said stand-pipe, whereby the liquid alternately rises and falls in said stand-pipe and in said measuring vessel past where said vessel communicates with said one of said aforesaid pipes, gas-conducting means between said measuring vessel and said analyzing means, and an ejector communicating with said induction pipe and receiving the discharge of said siphon, whereby said ejector induces a flow of said mixture into said one of the aforesaid pipes that is in communication with said measuring vessel during the fall of liquid in said stand-pipe and measuring vessel, so that some of said mixture is then drawn into said measuring vessel, and so that when said liquid rises in said stand-pipe and measuring vessel the operation of said siphon and consequent operation of the ejector has ceased before said liquid rises past where said measuring vessel communicates with said one of the aforesaid pipes, and whereby said liquid thus delivers a definite volume of said mixture to analyzing apparatus at substantially the pressure of said mixture that is then in a substantially quiescent state in said one of said aforesaid pipes.

18. In gas-analysis apparatus, a supply pipe leading from the ultimate source of supply of mixture, an induction pipe, means permitting flow of mixture from said supply pipe into said induction pipe but preventing back-flow of mixture from said induction pipe to said supply pipe, a gas pump comprising a measuring vessel, said induction pipe being in communication with said measuring vessel, a stand-pipe, means to supply liquid to said stand-pipe, means for conducting liquid between said stand-pipe and said measuring vessel, a siphon periodically discharging liquid from said stand-pipe, whereby the liquid alternately rises and falls in said stand-pipe and in said measuring vessel past where said vessel communicates with said induction pipe, gas-conducting means between said measuring vessel and said analyzing means, and an ejector receiving the discharge of said siphon, said induction pipe communicating with said ejector and opening to the atmosphere therethrough, whereby said ejector induces a flow of said mixture into said induction pipe during the fall of liquid in said stand-pipe and measuring vessel, so that some of said mixture is then drawn into said measuring vessel, and so that when said liquid rises in said stand-pipe and measuring vessel, the operation of said siphon and consequent operation of said ejector has ceased before said liquid rises past where said measuring chamber communicates with said induction pipe, and whereby said liquid thus delivers a definite volume of said mixture to analyzing apparatus at substantially the atmospheric pressure of said mixture that is then in a substantially quiescent state in said induction pipe.

19. In apparatus for gas analysis, the combination of a main gas pipe line, means for causing intermittent flow of gaseous mixture in said main gas pipe line, and a gas pump adapted to draw successive charges of gases from said main pipe line and to deliver a measured quantity of each charge for analysis, and means in said main pipe line for permitting the flow of gases in one direction and for preventing the flow of gases in the opposite direction.

20. In apparatus for gas analysis, the combination of a main gas pipe line, means for causing intermittent flow of gaseous mixture in said main gas pipe line, a gas pump adapted to draw successive charges of gases from said main pipe line, means whereby said pump discharges said charges of gases for analysis, means in said main pipe line for permitting the flow of gases in one direction and for preventing the flow of gases in the opposite direction, and means for opening up a free communication between the interior of said gas pump and the atmosphere, at a time in the operation of the apparatus when said charges of gases are about to be discharged for analysis, whereby the pressure of each of said charges of gases to be analyzed is substantially equalized with the pressure of the atmosphere.

21. In gas-analysis apparatus, means to supply gas mixture to analyzing means comprising a siphon and an ejector receiving and operated by the discharge of said siphon, and means to eliminate the effect of capillarity of a subnormal discharge of said siphon through said ejector.

22. A siphon-operated ejector, and means to eliminate the effect of capillarity of a subnormal discharge of said siphon through said ejector.

23. A siphon-operated ejector.

24. A siphon-operated ejector, and means for causing intermittency of the siphon operation.

25. A siphon-operated ejector, means for causing intermittency of the siphon operation, and means for eliminating the effect of capillarity in the outlet of said ejector between the siphon operations.

26. In gas-analysis apparatus, means to supply gas mixture to analyzing means comprising a siphon and an ejector receiving and operated by the discharge of said siphon, and means to eliminate the effect of capillarity of a subnormal discharge of said siphon through said ejector consisting of an extended surface adjacent to the final outlet orifice, along which drops of liquid may travel away from said orifice.

27. A siphon-operated ejector, and means to eliminate the effect of capillarity of a subnormal discharge of said siphon through said ejector consisting of an extended surface adjacent to the final outlet orifice, along which drops of liquid may travel away from said orifice.

28. A siphon-operated ejector, means for causing intermittency of the siphon operation, and means for eliminating the effect of capillarity in the outlet of said ejector between the siphon operations, consisting of an extended surface adjacent to the final outlet orifice, along which drops of liquid may travel away from said orifice.

CHARLES W. HEATH.

Witnesses:
CLARENCE PERDEW,
IRENE PARKER.